N. C. CHRISTENSEN, Jr. & T. P. HOLT.
PROCESS OF TREATING ORES.
APPLICATION FILED AUG. 3, 1911.
1,107,240.
Patented Aug. 11, 1914.
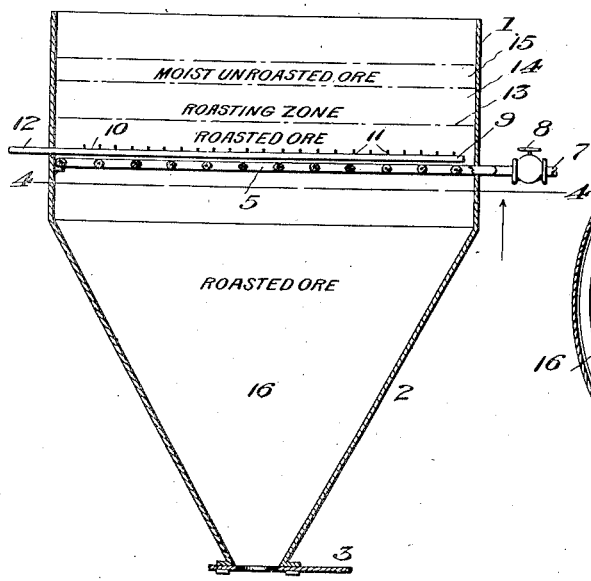
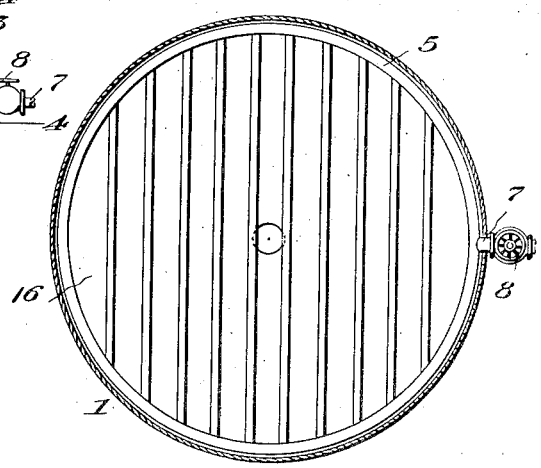
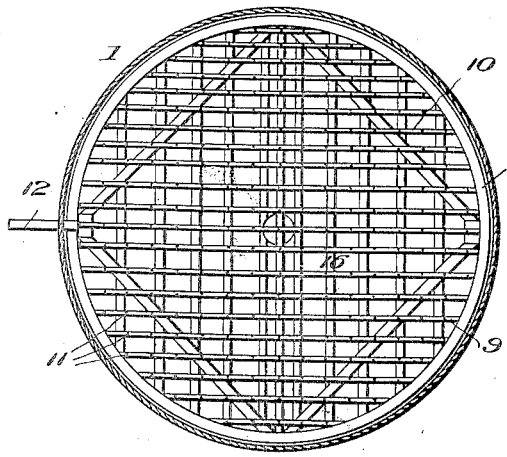
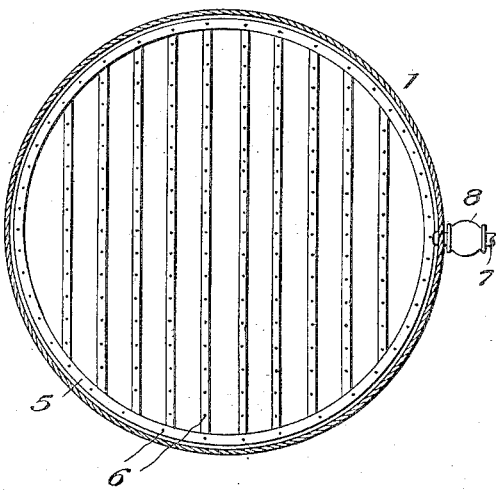

UNITED STATES PATENT OFFICE.

NIELS C. CHRISTENSEN, JR., AND THEODORE P. HOLT, OF SALT LAKE CITY, UTAH; SAID CHRISTENSEN ASSIGNOR TO GEORGE H. DERN, OF SALT LAKE CITY, UTAH.

PROCESS OF TREATING ORES.

1,107,240.  Specification of Letters Patent. Patented Aug. 11, 1914.

Application filed August 3, 1911. Serial No. 642,088.

*To all whom it may concern:*

Be it known that we, NIELS C. CHRISTENSEN, Jr., and THEODORE P. HOLT, citizens of the United States, residing at Salt Lake City, county of Salt Lake, and State of Utah, have invented certain new and useful Improvements in Processes of Treating Ores, of which the following is a specification.

Our invention relates to a process for treating ores, comprising their preparation, subsequent roasting, and lixiviation.

One object is to provide a new process of roasting ores, which will convert the useful metals therein to forms favorable to subsequent extraction by lixiviation both as regards their chemical and physical condition, by the removal of deleterious ingredients or the conversion of the ore into forms less, or not at all, detrimental in such subsequent lixiviation processes.

Our process embodies as a part thereof, subjecting the ore, when relatively finely crushed or divided and suitably ignited, to an air blast to bring about the desired chemical and physical changes by the oxidation of the proper proportion of fuel in intimate mixture with the ore. Those ores which contain sufficient natural fuel will not need the addition of fuel preparatory to roasting, but with ores which do not contain an adequate quantity of fuel, a suitable quantity of ore will be intimately mixed with finely divided fuel or with other finely crushed ores containing natural fuel, so as to secure an intimate and uniform mixture of the proportion of fuel with the ore. The ore having been finely crushed or otherwise provided in the desired degree of fineness and intimately mixed with the fuel, however provided, the roasting of the ore is carried out by oxidation of the fuel by igniting a part of the charge and forcing air through it in any suitable roasting apparatus, thus heating the ore very efficiently and with the use of a very small amount of fuel and, when chemicals are mixed with the ore, bringing about the desired chemical reactions, such as oxidizing, chloridizing, sulfatizing, etc., preparatory to treatment by subsequent lixiviation processes.

We wish it understood that that part of our process constituting roasting is not carried out by the utilization of natural draft, but by the use of air forced under pressure into the ore and regulated at will. Furthermore, while we have invented a new ore roasting apparatus peculiarly adapted for carrying out our process, such apparatus is not essential to the process, as other apparatus, if provided with means for the injection of an air blast or the like, may be utilized in conducting the roasting process.

Our complete preparatory, roasting, and extraction process contemplates crushing or treating the ore to bring it to relative fineness, say, with particles not larger than one-sixth of an inch in diameter, more or less, providing finely divided fuel if the ore itself does not possess its own fuel; moistening with water; using chemical reagents, such as salt for chloridizing, when desired; roasting the mixture in an ore roaster by first igniting the charge and then subjecting it to a positive blast of air or the like forced through the mixture and under the control of the operator to secure the desired temperature in the roasting zone by which the ore or mixture of ore and chemicals is brought to the desired temperature requisite to effect the desired chemical and physical changes; and, if desired, introducing steam or gaseous or vaporized chemicals into the roasting zone mixed with the air in the blast; and thereafter extracting the useful metals from the ore by lixiviation with a suitable solvent.

As a secondary process we treat the ore being roasted in a new manner, but such peculiar treatment is not essential in carrying out the process and is to be considered as a separate and additional, or secondary, process.

Our secondary process is, after preparing the moistened and finely divided ore as heretofore set forth, to introduce the charge into the roaster above the roasting zone, withdraw the roasted ore from beneath the roasting zone by suitable devices, maintaining a sufficient depth of roasted ore below the roasting zone and above the point where the air blast enters the charge, so that the discharging ore is cooled to a temperature a little above that where the blast enters, and a sufficient depth of moistened unroasted ore being maintained above the roasting zone to cool the hot gases coming from the roasting zone to a temperature a little above that of the ore charged. In this secondary process the ore is continuously or intermittently charged above the roasting zone and withdrawn below it, and thus a uniform counter-current of finely crushed ore is presented to the air which enters under positive pressure. In this secondary process, the temperature of the roasting zone is under the control of the operator by the regulation of the volume of air forced under pressure into the ore, as it is of great importance that the ore be not fused or sintered and that the proper temperature be maintained in the roasting zone to bring about the desired chemical reactions. Furthermore, in this secondary process, enough moist ore should be maintained above the roasting zone to cool the discharging gases and prevent the loss of valuable metals as volatile compounds or dust. This is of peculiar importance in chloridizing silver-gold ores, since the loss of gold and silver by the ordinary methods of chloridizing constitutes a serious factor in many instances with other processes.

In carrying out our secondary process, we use a novel apparatus which, however, is not an essential part of the said secondary process and need not, necessarily, be utilized in carrying out said secondary process.

Our process of treating ores preparatory to roasting, and lixiviation, can be practised independently of our roasting process and we claim such preparatory process, in its various modifications, as an independent invention, although it is primarily designed for preparing the ore for treatment in our complete process and is peculiarly adapted to that end.

The essential steps and qualifications thereof, of our primary or main process and of our secondary process, as also our process of preparing ores for roasting and lixiviation are, respectively, set forth in the following detailed description of our said processes.

*Our primary process.*—The ore carrying the gold, silver, copper or other metals to be recovered in the subsequent wet processes must first be crushed or brought to a finely divided condition, the size of the particles varying with the character of the ore, but unless the ore is very porous, the particles should be not larger than one-sixth of an inch in diameter and in most cases finer than this.

If the ore contains enough oxidizable substances, such as carbon, pyrite, etc., to supply the fuel necessary to give the heat required during the roast, the finely divided or crushed ore is then ready for the next step. If, however, the ore does not contain the requisite amount of fuel or no fuel at all, enough fuel must be added to it to insure the proper proportion of fuel. This fuel may be in the form of coal-dust, crushed pyrite, saw-dust, charcoal, crude oil, etc., and should be mixed uniformly with the ore, as this is essential to the success of the roasting process. If the ore contains too much fuel, it should be mixed with other ores containing little or no fuel in order to secure the proper proportion of fuel of the kind or kinds used. In any event, the fuel, the ore containing the additional fuel, or the ore used to dilute the excess of fuel in the ore which has been previously crushed for purposes of roasting, should be finely crushed or divided to a size, say, one-sixth of an inch in diameter, or finer, the same as has been done with the ore itself and all uniformly and intimately mixed so that the desired proportion of fuel will average substantially the same throughout the mass.

The proportion of fuel will vary slightly with the fineness and character of the ore, and it should be sufficient to maintain the roast after it has been started, but without causing a sufficient temperature to sinter or fuse the ore, as sintering or fusing should not occur. As an instance of the proportion of fuel to the ore we mention that fuel having a heating value equal to from two to six parts of an ordinary grade of bituminous coal to one hundred parts of ore has been used by us with success, but we have secured the best results where the proportion of fuel equals to from two to three per cent. of the entire amount of ore, provided a fair grade of bituminous coal be used as the fuel.

So far as we are aware, we are the first to mix together finely divided or crushed ore and finely divided or crushed fuels in the requisite proportions so that when subsequently roasted, the fuel will maintain the roast without bringing about fusing or sintering, and we claim this as a new step in the treatment of ores preparatory to roasting, for subsequent lixiviation.

A permissive, but not essential, part of the process may consist in the mixing of suitable chemicals, according to results desired, along with the fuel. Some ores will require no chemical reagents. Salt for chloridizing, etc., is indicated as one chemical which may be mixed with the ore and fuel.

We are aware that it has been proposed heretofore to mix chemicals with finely crushed ore previous to roasting in the ordinary type of roaster, but we believe ourselves to be the first to mix chemicals with finely crushed ore and fuel in a process of roasting for subsequent lixiviation which contemplates the subjection of the ore, fuel and chemicals to roasting maintained by a forced blast of air and we claim this as a part of our invention.

The next step in the preparation of the mixed ore and fuel is the moistening of the mixture previous to charging into the roasting apparatus. The exact quantity of water will vary with the fineness and character of the ore, but water should be added in sufficient quantity to prevent dusting, though not to cause the formation of a mud. The volume best adapted for this purpose is that proportion which will render the mixture most open and permeable to the blast in the process of roasting for subsequent lixiviation, and our experiments show that this proportion may be varied from five per cent. for coarse, non-absorbent ore to sixteen per cent. for fine, absorbent ore. The water aids both mechanically and chemically, in the subsequent roasting process and it is an essential to the successful carrying out of our roasting process. The water may, in some cases, be considered as a chemical agent as, for instance, when chloridizing of the ore is the end sought.

The permissive step heretofore set forth—that of adding chemicals to the ore and fuel, may be carried out at this point by the addition, with the water, to the mixture of ore and fuel, of soluble chemicals dissolved in the water, thus securing a most efficient distribution and intimate contact between the chemicals and particles of the ore with which they are desired to react.

The mixing and moistening of the ore should be carried out in an apparatus suitably arranged and adapted to avoid the formation of any large balls or lumps and which will insure, on the other hand, the delivery of the ore in as light and porous a condition as possible. The ore thus prepared is now roasted in any apparatus suitably arranged for igniting the charge and oxidizing the fuel therein by means of a blast of air forced through the charge and maintaining the roast by the blast of air, the blast being regulated by a valve so that any desired volume, or pressure, or both, may be obtained and may be changed or varied from time to time as found necessary. The control of the air blast is necessary to the regulation of the temperature of the roasting zone which, in turn, is vital to the success of the roasting process, as the ore must not be fused or sintered and the proper temperature to bring about the chemical reactions must be secured. The use of a blast of air under pressure and subject to regulation is not to be confused with roasters or kilns employing a natural draft.

Our process of roasting for subsequent lixiviation, involving the oxidizing of the fuel by the employment of a blast of air forced through the charge, is a new invention, aside from the process before set forth for preparing ores for roasting, and this roasting process may be carried out in any apparatus in which the roast can be started and thereafter maintained by means of a blast of air. We have carried out our roasting process on several different types of intermittent roasters in which the ore is charged upon a bed of glowing coals or ignited with a gas or oil burner and roasted by forcing air up through the charge. Any apparatus of this type using pressure or suction, or up or down draft, of either an intermittent or continuous type, may be successfully used in carrying out our process, but if the process is carried out in this fashion, a considerable amount of fuel is consumed, or repeated starting of the roast becomes necessary, and we have, therefore, invented our new secondary process which is continuous in operation and obviates the necessity of the repeated starting of the roast, but we wish it understood that this secondary process is not essential to the carrying out of our primary roasting process, although it is preferably used to obtain the greatest efficiency from our roasting process.

Whether or not our process be carried out by using the secondary roasting process, the introduction of the blast of air under pressure results in a temperature in the roasting zone dependent on the percentage of fuel present and the volume of air forced through the charge in a unit of time and should, as before set forth, be so regulated as to avoid any fusing or sintering of the ore.

It will be appreciated by those skilled in the art that the cost of the fuel as used in our process is low, since many ores and mixtures of ores contain enough oxidizable substances, such as carbonaceous material, pyrite, etc., to render it unnecessary to add additional fuel, and the forms of fuel which may be utilized, such as coal-dust, pyrite, saw-dust, etc., are very cheap when compared with fuels which must be used in the ordinary roasting processes.

The final step of our process consists in extracting the useful metals from the roasted ore by lixiviation with a suitable solvent.

Our secondary process is the starting of the roast from below, maintaining it by means of a blast of air from below and, after the roast is once started, charging the moistened and prepared ore onto the charge above the roasting zone and withdrawing the roasted ore from beneath the roasting zone by suitable devices. In doing this, we secure a uniform counter-current of finely crushed ore as opposed to air under positive pressure, and discharge the ore from the roasting furnace with practically no loss of air. The uniform current of air under pressure is secured by forcing it into the charge in a horizontal plane over the entire cross-sectional area of the charge. To secure the highest efficiency of heating and to prevent loss of valuable volatile compounds during the roast, a sufficient depth of roasted ore should be maintained below the roasting zone and above the point where the air pressure enters, so that the discharging ore is cooled to a temperature a little above that in the blast, and a sufficient depth of moistened unroasted ore should be maintained above the roasting zone to cool the hot gases coming from the roasting zone. By this means the loss of heat in the roast is reduced to a minimum, as practically no heat is carried away from the roast by the discharging ore or escaping gases. The cooling of the gases coming from the roasting zone insures the condensation in the cold ore above of the volatile metallic compounds. This is of great importance in the chloridizing of silver-gold ores, since the loss of gold and silver by the ordinary methods of chloridizing is a serious factor with many processes.

Our process has special application to the preparation of gold ores for cyanid treatment such as the following: gold ores which contain carbon or carbonaceous material which must be eliminated before cyanid treatment in order to secure an efficient extraction of the gold; gold ores containing elements or compounds which must be eliminated or chemically altered in order to avoid a high consumption of cyanid, such as ferrous salts, etc.; gold ores in which the gold must be released from chemical combinations which prevent or hinder its extraction by cyaniding, such as tellurides, etc.; gold ores in which the physical state, association or habit of occurrence is such as to prevent or hinder the extraction of the gold and which conditions can be removed or improved by roasting, such as gold inclosed in pyrite, etc.; gold ores in which the chemical or physical states of the gold ore or gangue may be altered by roasting with or without the addition of chemicals, so as to prepare the ore for the extraction of the gold therefrom in any subsequent lixiviation process such as the cyanid process, chlorination processes, etc.

Our process has special application to the chloridizing of silver ores preparatory to the extraction of the silver by the cyanid process, hyposulfite process, or other lixiviation processes.

Our process has special application to the chloridizing, sulfatizing, and oxidizing of copper ores, preparatory to lixiviation. The solutions for the subsequent lixiviation may be efficiently generated by condensing the acid fumes given off during the roast.

Our process has special application to the preparation by roasting with or without the addition of special chemicals of ores of any of the valuable metals for lixiviation processes for the extraction of the valuable metals.

Our roasting process, while capable of being carried out by different forms of apparatus, may be efficiently performed by the use of the apparatus shown in the accompanying drawings, in which—

Figure 1 is a vertical section through the apparatus with the strata or layers of ore designated according to their respective conditions; Fig. 2, a plan view of the apparatus, the stirring grate having been removed; Fig. 3, a similar view showing the air blast pipes and stirring grate. Fig. 4, a section on line 4—4, Fig. 1, the stirring grate being removed.

The roaster has a cylindrical upper part 1 and a lower part or hopper 2. The upper part 1 is open so that the ore may be charged thereinto, but the lower part is closed by an adjustable discharge gate 3 by which the quantity of roasted ore discharged may be regulated.

Disposed in the cylindrical upper part 1 is an air blast device 5 which is composed of a circular pipe and cross pipes, all in communication and provided with openings 6 on their lower sides. The number of the openings will be relatively large to insure a regular or even distribution of the air blast throughout the entire mass of roasted ore adjacent thereto. The air blast device or distributer is supplied from any suitable air compressing or forcing means or reservoir through a pipe 7 which is controlled by one or more valves 8 to regulate the volume and the pressure of the air admitted through the openings 6.

Disposed above the air blast device is a rockably mounted stirring grate 9 composed of grate bars 10 connected by a suitable framework, and provided with upwardly extending teeth 11 arranged on the bars 10 in relatively great numbers to insure a thorough disintegration and uniform settling of the roasted ore. This grate is adapted to be rocked in a horizontal plane by any suitable operating device 12 which may be moved back and forth by power of any kind.

In using the foregoing apparatus to carry out our roasting process after the ore has been first prepared as previously set forth, the roaster is first filled with loose, dry ore which has been previously roasted as at 16, a sufficient amount being introduced to bring the ore up to the level indicated at 13. The air blast is now admitted by opening the valve 8, and the air jets being first forced downward into the body of the ore and then returning upward past the air blast device, are distributed with great uniformity over the entire cross-sectional area of the charge.

A fire, preferably made from small pieces of wood or charcoal is now started on top of the dry ore at the level 13, and a thin uniform bed of burning coals secured over the entire surface. The moistened mixture of finely crushed ore and fuel prepared according to our preparatory process is now charged on the live coals in a layer about six to twelve inches thick and spread as loosely and uniformly as possible by raking or other spreading operation. The fuel in the mixture is thus ignited and the roasting zone 14 proceeds upward into the unroasted ore 15 uniformly over the entire cross-sectional area of the charge. The roasting zone having once been established as indicated at 14, the stirring grate 9 is oscillated, and the discharge gate 3 opened to an extent which will permit the proper amount of ore to discharge to keep the roasting zone 14 in practically the same position. The slow oscillatory movement of the stirring grate prevents any tendency of the ore to settle unevenly, and also assists, through the agitation caused by the fingers 11, in securing a uniform distribution of the blast of air over the entire cross-sectional area of the charge.

The counter current of ore opposed to the air blast effects an important result, as, owing to the low percentage of fuel used in the mixture prepared according to our process, the roasting zone will usually not exceed a thickness of from six to eight inches, and it is important that this roasting zone be maintained in a substantially horizontal position to avoid passing downward of any unroasted ore. The ore prepared according to our process is continually charged above the roasting zone, as indicated at 15, and withdrawn from below the roasting zone, as indicated at 16. The temperature of the roasting zone is under the control of the operator by the regulation of the volume and pressure of air by controlling the valve 8, and this we consider of importance, as such regulation of the blast enables the operator to prevent fusing or sintering of the ore and makes possible the maintenance of the proper temperature in the roasting zone 14 to bring about the desired chemical reactions. Preferably, enough previously prepared moist ore, say a layer of from three to six inches in thickness, should be maintained above the roasting zone, as at 15, to cool and condense the discharging gases and prevent the loss of metallic values as volatile compounds or dust.

The discharging gases are free from dust and may be easily condensed and used for subsequent lixiviation, when desirable.

Steam, gaseous or vaporized chemicals may be introduced into the roasting zone mixed with the air of the blast when desired.

In our claims, in the use of the expression "bringing finely divided fuel into intimate mixture" with the ore, we intend to cover and include a preliminary treatment which provides ore in a finely crushed or divided state with fuel intimately mixed therewith, whether derived from the ore itself as a natural part thereof, or added thereto as a separate fuel, or, as a mixture with the ore of another ore bearing a fuel, any of which steps, as we have previously pointed out, may be taken to provide an ore which is adapted to be roasted by internal combustion thereof and afterward lixiviated with a suitable solvent.

Where reference is made in our claims to the use of an "air-blast", we use this statement in a generic sense, covering all artificially produced drafts resulting in air supply, however provided, as distinguished from mere natural draft. The expression in the claims "bringing finely divided fuel into intimate mixture" with the ore, has reference to the act of intimately mixing the ore and fuel, whether the fuel be carried by the ore in a natural state, or, with those ores which carry no natural fuel, subsequently intimately mixing fuel therewith.

Having thus described our invention, what we claim as new and desire to secure by Letters Patent, is:—

1. A process of treating ore, consisting in preliminarily finely dividing the ore and bringing finely divided fuel into intimate mixture therewith, igniting the fuel carried by a charge of the preliminarily prepared ore and roasting the charge by internal combustion thereof at a temperature and in a manner such as will not fuse or sinter the ore, and afterward extracting the useful metals from the roasted ore by lixiviation with a suitable solvent.

2. A process of treating ore, consisting in preliminarily finely dividing the ore and bringing finely divided fuel into intimate mixture therewith, igniting the fuel carried by a charge of the preliminarily prepared ore and, by an air blast, roasting the ignited charge by internal combustion thereof at a temperature insufficient to fuse or sinter the ore, and thereafter extracting the useful metals from the roasted ore by lixiviation with a suitable solvent.

3. A process of treating ore, consisting in preliminarily finely dividing the ore and bringing finely divided fuel into intimate mixture therewith, igniting the fuel carried by a charge of the preliminarily prepared ore, and by an air blast regulated at will, roasting the ignited charge by internal combustion thereof at a temperature insufficient to fuse or sinter the ore, and thereafter extracting the useful metals from the roasted ore by lixiviation with a suitable solvent.

4. A process of treating ore, consisting in preliminarily finely dividing the ore and bringing finely divided fuel into intimate mixture therewith, the fuel being in the proportion of from two to six per cent. of the ore, igniting the fuel carried by a charge of the preliminarily prepared ore and roasting the charge by internal combustion thereof, and thereafter extracting the useful metals from the roasted ore by lixiviation with a suitable solvent.

5. A process of treating ore, consisting in preliminarily finely dividing the ore and bringing finely divided fuel into intimate mixture therewith and adding chemicals to the mixture of fuel and ore according to the results desired from the subsequent treatment of the ore, igniting the fuel carried by a charge of the preliminarily prepared ore and roasting the charge by internal combustion thereof, and thereafter extracting the useful metals from the roasted ore by lixiviation with a suitable solvent.

6. A process of treating ore, consisting in preliminarily finely dividing the ore and bringing finely divided fuel into intimate mixture therewith and adding chemicals to the mixture of fuel and ore according to the results desired from the subsequent treatment of the ore, moistening the mixture of ore, fuel and chemicals, igniting the fuel carried by a charge of the preliminarily prepared ore and roasting the charge by internal combustion thereof, and thereafter extracting the useful metals from the roasted ore by lixiviation with a suitable solvent.

7. A process of treating ore, consisting in preliminarily finely dividing the ore and bringing finely divided fuel into intimate mixture therewith, moistening the mixture of finely divided ore and fuel, igniting the fuel carried by a charge of the preliminarily prepared ore and roasting the charge by internal combustion thereof at a temperature insufficient to fuse or sinter the ore, and thereafter extracting the useful metals from the roasted ore by lixiviation with a suitable solvent.

8. A process of treating ore, consisting in preliminarily finely dividing the ore and bringing finely divided fuel into intimate mixture therewith, moistening the mixture of finely divided ore and fuel, the water used in moistening being in the proportion of from five to sixteen per cent. of the ore and fuel to which it is added, igniting the fuel carried by a charge of the preliminarily prepared ore and roasting the charge by internal combustion thereof, and thereafter extracting the useful metals from the roasted ore by lixiviation with a suitable solvent.

9. A process of roasting ores, consisting in maintaining a roasting zone in the charge undergoing roasting by a blast of air, adding the ore to the charge above the roasting zone, taking off the roasted ore below the roasting zone, and agitating the charge in the vicinity of the admission of the blast to thereby open up the ore and facilitate the distribution of the blast throughout the ore and insure uniform settlement of the charge.

In testimony whereof, we hereunto affix our signatures in presence of two witnesses.

NIELS C. CHRISTENSEN, Jr.
THEODORE P. HOLT.

Witnesses:
  A. M. Cheney,
  John Jensen.